United States Patent [19]

Lau

[11] Patent Number: 5,158,139

[45] Date of Patent: Oct. 27, 1992

[54] WELL COMPLETION METHOD AND FLUID LOSS CONTROL COMPOSITION

[75] Inventor: Hon C. Lau, Houston, Tex.

[73] Assignee: Shell Oil Company, Houston, Tex.

[21] Appl. No.: 718,036

[22] Filed: Jun. 20, 1991

[51] Int. Cl.$^5$ .................. E21B 43/02; E21B 43/12
[52] U.S. Cl. ................................ 166/278; 166/297; 166/300; 252/8.551
[58] Field of Search ............... 166/278, 282, 283, 294, 166/297, 300, 305.1, 312; 175/72; 252/8.551

[56] References Cited

U.S. PATENT DOCUMENTS

| | | | |
|---|---|---|---|
| 2,832,415 | 4/1958 | Reistle, Jr. | 252/8.551 X |
| 3,408,296 | 10/1968 | Kuhn et al. | 252/8.551 |
| 3,605,899 | 9/1971 | Tate et al. | 166/300 |
| 3,779,914 | 12/1973 | Nimerick | 166/283 X |
| 3,938,593 | 2/1976 | Friedman | 166/307 |
| 4,369,843 | 1/1983 | Mondshine | 252/8.551 X |
| 4,487,265 | 12/1984 | Watanabe | 166/307 |
| 4,620,596 | 11/1986 | Mondshine | 252/8.551 X |
| 4,621,692 | 11/1986 | Mondshine | 166/278 X |
| 5,007,481 | 4/1991 | Williams et al. | 166/300 |

OTHER PUBLICATIONS

SPE Paper 18211, "Laboratory and Field Evaluation of a Combined Fluid-Loss Control Additive and Gel Breaker for Fracturing Fluids," by Cantu and Boyd (1988).

*Primary Examiner*—George A. Suchfield
*Attorney, Agent, or Firm*—Del S. Christensen

[57] ABSTRACT

Polymers used to prevent fluid loss from boreholes may be eliminated after a predetermined time by including with the polymer composition halogen-substituted organic acids or their salt derivatives. These components hydrolyze, releasing hydrogen-halogen acids which break down the polymers within the wellbore or formation.

14 Claims, No Drawings

WELL COMPLETION METHOD AND FLUID LOSS CONTROL COMPOSITION

FIELD OF THE INVENTION

This invention relates to an improved well completion method and to an improved fluid loss composition comprising polymers wherein the polymers are broken by delayed release of acids.

BACKGROUND OF THE INVENTION

Wellbore holes for production of oil and gas from subterranean formations are typically completed by placement of a casing, cementing of the casing, and then perforating the casing to provide communication between the formation and the inside of the casing. When the formation is a poorly consolidated formation, the perforating is followed by insertion of a wire-wrapped screen and a gravel packing between the screen and the inside of the casing. A production tubing is then inserted along with packers, pumps or other artificial lift devices as required to produce fluids from the wellbore.

Temporarily controlling permeability at the borehole surfaces is critical during this completion process. While drilling is proceeding, and throughout the completion process, the hydrostatic pressure of the fluids within the borehole is maintained above the formation pressures. This prevents formation fluids from entering the borehole, displacing the drilling fluid with less dense liquids and resulting in a "kick" or a blow-out. The loss of drilling fluids into the formation is controlled by fluid loss control additives. These additives cause a cake to be formed at the borehole wall which provides a low permeability barrier. This cake keeps the drilling fluids within the borehole in spite of the fluids within the borehole being at pressures greater than the formation pressures. During drilling this barrier generally does not have to be removable. But when a potential oil or gas producing formation is being drilled, it is desirable to have a barrier which is removable.

After the borehole is drilled through the target formations, casings are set and cemented into place. The casing is then perforated, usually by explosive charges which send projectiles from a gun within the casing through the casing and into the formation. These perforations serve as conduits for formation fluids to flow into the borehole when production commences. Until the well completion is finished, fluid loss into these perforations must be minimized in order to prevent damage to formation permeability. This fluid loss must be controlled by a means which does not inhibit formation fluids from entering the casing via the perforations when production commences.

To provide a fluid loss control which can be removed when the need for it is eliminated, liquid biopolymers, natural polymers and their derivatives are typically utilized. Biopolymers include polysaccharides, and xanthan gum. Natural polymers and their derivatives include starch, carboxymethylcellulose (CMC), low molecular weight hydroxyethyl cellulose (HEC), and carboxymethylhydroxyethyl cellulose (CMHEC). These polymers are typically removed by flushing the borehole with acidic compounds. Acids degrade the polymers and permit removal of the barrier. These polymers may be used in conjunction with the salt granules. Salt granules, by themselves, generally do not form a sufficient barrier, but in conjunction with a biopolymer such as starch, are very effective.

The post-flush with acid can degrade polymers which come into contact with the post-flush, but it is difficult to contact a significant portion of the polymer barrier with the post-flush. Once a portion of the barrier is degraded, the fluids will flow into the formation from the break in the barrier. Significant portions of the barriers are bypassed unless the post-flush is continued for an extended period. Extending this post flush for a long period is undesirable due to the cost, delay, and the acids which are then produced from the wellbore as production begins.

It would be preferable to have a polymer breaker which could be generated from an inert precursor, the precursor being present throughout the barrier, and generating the polymer breaker in significant quantities when the barrier is no longer needed. Many compounds which hydrolyze to form acids, such as esters, do so at rates which significantly decrease at even slightly acidic pHs. It would be further advantageous to have a precursor which degraded at predictable rates which did not vary significantly with pH. It would also be advantageous to have such a precursor which is water soluble. A soluble breaker would not be susceptible to physical separation from the effective portion of the fluid loss barrier. Further, a soluble breaker could be present in both the initial fluid loss composition, and subsequent wellbore fluids to ensure that the fluid loss barrier is totally exposed to the breaker.

It is therefore an object of the present invention to provide a well completion method and a fluid loss control composition wherein an effective fluid loss barrier is established from an aqueous mixture of polymers which contains soluble precursors to polymer breakers. It is a further object to provide such a method and composition wherein the release of polymer breakers from the precursors is not strongly pH dependent. It is a further object to provide such a method and composition wherein the fluid loss barrier is effectively removed, resulting in a formation permeability in the vicinity of the perforations which is not reduced by remnants of the fluid loss composition.

SUMMARY OF THE INVENTION

These and other objects of the present invention are achieved by a process comprising the steps of:

a) determining the concentration of a halogen-substituted organic acid or a salt of a halogen-substituted organic acid required to decrease the molecular weight of the polymer to an extent where the polymer is not an effective fluid loss control agent under reservoir conditions after a period of time;

b) preparing an aqueous-based mixture of an amount of the polymer effective for fluid loss control and the required concentration of the halogen-substituted organic acid or halogen-substituted organic acid salt;

c) injecting the aqueous-based mixture into the wellbore; and d) spotting the aqueous-based mixture in a region of the wellbore from which fluid loss is to be controlled.

The fluid loss composition of this invention can effectively control fluid loss for a predetermined time period without permanently reducing permeability in the region of the wellbore where fluid loss is to be controlled. Such temporary control is needed after perforation of the casing and formation, and after gravel is placed in a gravel-packing operation. Because the regions within which fluid loss needs to be controlled are also the regions from which the formation will be produced into the wellbore, it is important to temporary control of fluid loss without permanently reducing permeability.

The halogen-substituted organic acid hydrolyzes in the presence of water to form hydrogen-halogen (a strong acid) and an alcohol-substituted organic acid. Salt functionality increases the water solubility of this acid precursor, thereby allowing the precursor to be dispersed throughout the polymer barrier and is therefore preferred. The hydrogen-halogen acid generated will degrade the polymer in a controlled manner, destroying water-loss barrier after it has served its purpose.

DETAILED DESCRIPTION OF THE INVENTION

Polymers which are useful as fluid loss additives are well known. Any of these polymers may be utilized in the practice of the present invention. These polymers include, but are not limited to, polysaccharides, starches, starch derivatives, hydropropyl guar, guars, xanthan gum, carboxymethylcellulose (CMC), low molecular weight hydroxyethyl cellulose (HEC), carboxymethylhydroxyethyl cellulose (CMHEC), sodium acrylate and crosslinked derivatives of the above. Effective concentrations of each are known, and depend upon such variables as porosity, permeability and temperature of the formation. Generally, from 10 to 200 pounds per thousand gallons of solution of these polymers are utilized.

Graded salt fluid loss pills are also known. These graded salt pills typically contain a starch or a starch derivative and a polymer, e.g. HEC or xanthan gum. The present invention can also be utilized with these pills. The breakers of this invention break down the starches and the polymers, and water then invades the barrier, dissolving the salt.

The polymers are generally prepared in a separate batch of completion fluids, and then injected into a work string where they flow to bottom of the wellbore, and then out of the work string and into the annulus between the work string and the casing or wellbore. This batch of polymers is typically referred to as a "pill." The pill is typically pushed by injection of other completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. The polymers then form a barrier near the wellbore surface. This barrier significantly reduces fluid flow into the formation.

This fluid loss barrier must be a temporary barrier when fluids are going to be produced from the portion of the formation being treated to reduce fluid loss. Formation fluids are typically to be produced from formations treated to control fluid loss after perforating, and after gravel packing operations.

The halogen-substituted organic acid of this invention will hydrolyze when contacted with water to form hydrogen halogen and alcohol-substituted organic acid salts. Salt functionality renders this acid precursor more water soluble than an acid functionality, and provides a higher initial pH. Salt derivatives are therefore preferred. Acceptable halogen-substituted organic acids include: 3-iodobenzoic acid, 2-iodobenzoic acid, 2-chloroethanesulphonic acid, 2-chloro-3,5-dinitrobenzoic acid, dichloroacetic acid, iodoacetic acid, monochloroacetic acid, 2-chloroacetamide, succinimide, 2-bromobenzoic acid, bromoacetic acid, 2-chloropropionic acid, 3-chloropropionic acid, 3-bromopropionic acid, 3-chlorobutyric acid, and maleimide.

Halogen-substituted organic acid or their salt derivatives having from one to three carbons are preferred due to their greater water solubility.

Sodium salts of the halogen-substituted organic acids are most preferred due to the relative availability of the sodium salt derivatives, but generally any monovalent metal cations will be sufficient. Potassium and ammonium salts along with the sodium salts are preferred.

The cost of the fluid loss treatment can be minimized by optimizing the polymer and breaker precursor to the reservoir conditions and the length of time the fluid loss treatment needs to be effective. Utilization of a breaker precursor with a half life which is too short in relation to the desired length of time for the fluid loss treatment and the reservoir temperature will result in a larger amount of biopolymer being required.

Mono halogen-substituted organic acid salts generally have longer half lives than higher substituted organic acid salts do at the same temperatures and pHs. Higher carbon number halogenated organic acid salts have shorter half lives than equivalent lower carbon number molecules. The position of the halogen on the hydrocarbon chain also significantly affects the half life of the halogen-substituted organic acid salt. For example, 3-chloropropionic acid sodium salt at 141° F. and a pH of 7 and has a half life of about 16 hours, whereas 2-chloropropionic acid sodium salt at this temperature and pH has a half life of about 40 hours.

A basic material may optionally be included with the aqueous mixture of this invention. The inclusion of a basic material in the fluid loss composition reacts with the earlier generated acids, thus preventing them from significantly affecting the biopolymer barrier. This can result in a more abrupt release of acid when the basic material is consumed and converted to salt.

Acceptable amounts and types of fluid loss polymers are determined by methods well known in the art.

The performance of specific polymers and halogen-substituted organic acid salts can be predicted by measuring the decline in constant shear-rate viscosity as a function of time at reservoir conditions. Although the constant shear-rate viscosity is not a direct measurement of fluid loss control capability, it is reflective of the rate of degradation of the polymers. It is therefore a good predictor of the time required to break the polymers and eliminate the effective fluid loss barrier.

The time period for which the fluid loss barrier will be required to be effective will vary considerably between applications. Generally, in gravel-packing operations, at least one "round trip" time is required. A round trip time is the time needed to retrieve equipment (e.g., perforating gun) from the bottom of the hole, and go back to the bottom of the hole with new equipment (e.g., gravel pack screen). Typically, about one hour per 1,000 feet of depth is required to pull or place work strings. Most typically, the time period for which fluid loss control will be required will be between about 7 and about 200 hours.

To ensure thorough removal of the polymer barrier, acid components may be injected into the formation after the fluid loss barrier is not needed to finish breaking the biopolymer barrier. This flush will be significantly more effective than the post-flush of the prior art polymer removal step because the permeability of the entire barrier is significantly increased by the acids generated by the breaker precursors of this invention. Such an acid post-flush is preferably initiated after the need for the fluid loss barrier no longer exists, i.e., the time period for which the fluid loss control is to be effective has expired.

Additional breaker precursor can also be injected into the wellbore following the initial injection of the fluid loss control pill. This ensures that the fluids in the vicinity of the fluid loss barrier formed by the polymers contains the acids being generated by the precursor. Because the fluids injected into the wellbore with the polymers are generally immobilized with the barrier just within the formation, following of the pill with additional precursor is not generally required.

The following examples are given to exemplify the invention, but do not limit the invention.

EXAMPLES

Two compositions of different biopolymers were combined with a 2. molar solution of mono chloroacetic acid sodium salt in water. The aqueous mixtures were then subjected to a constant 0.87 1/sec. shear rate and viscosity measurements were taken. The biopolymers were xanthan ("SF-XA"), and succinoglycan ("SF-S"). The two tests were run at 200° F. and 190° F., respectively. The viscosities measured for the compositions, both with and without breakers, are listed below in Table 1.

TABLE 1

| Time Hours | SF-XA With Breaker @ 200° F. | SF-XA Without Breaker @ 200° F. | Time Hours | SF-S With Breaker @ 190° F. | SF-S Without Breaker @ 190° F. |
| --- | --- | --- | --- | --- | --- |
| 0 | 3165 | 3571 | | | |
| 2 | 2972 | 3189 | 1 | 2106 | 2152 |
| 4 | 2798 | 3132 | 3 | 2005 | 2118 |
| 6 | 2652 | 3030 | 5 | 1943 | 2082 |
| 8 | 2473 | 2964 | 7 | 1897 | 2043 |
| 10 | 1794 | 2923 | 9 | 1849 | 2048 |
| 12 | 1419 | 2835 | 11 | 1781 | 2047 |
| 14 | 954 | 2792 | 13 | 1703 | 2040 |
| 16 | 486 | 2719 | 15 | 1604 | 2016 |
| 18 | 305 | 2640 | 17 | 1498 | 2016 |
| 20 | 205 | 2581 | 19 | 1451 | 2017 |
| 22 | 158 | 2487 | 21 | 1344 | 1998 |
| 26 | 117 | 2293 | 23 | 1321 | 2018 |
| 30 | 107 | 2167 | 25 | 1135 | 2024 |
| 34 | 95 | 1977 | 27 | 806 | 2051 |
| 38 | 96 | 1734 | 30 | 365 | 2006 |
| 44 | 97 | 1468 | 35 | 97 | 1993 |
| 50 | 91 | 1219 | 40 | 21 | 1937 |
| 56 | 93 | 1046 | | | |

From Table 1 it can be seen that inclusion of the breaker precursors results in a precipitious drop in biopolymer mixture viscosity after a period of relatively high viscosity. The aqueous biopolymer-containing mixture of the present invention is formulated so that this precipitious drop in viscosity occurs just after the time period for which the fluid loss barrier is to be effective expires.

I claim:

1. A process to control fluid loss from a wellbore for a controlled period of time utilizing a polymer fluid loss control agent comprising:
   a) determining the concentration of a halogen-substituted organic acid salt required to decrease the molecular weight of the polymer to an extent where the polymer is not an effective fluid loss control agent under reservoir conditions after a period of time;
   b) preparing an aqueous-based mixture of an amount of the polymer effective for fluid loss control and the required concentration of the halogen-substituted organic acid or halogen-substituted organic acid salt;
   c) injecting the aqueous-based mixture into the wellbore; and
   d) spotting the aqueous-based mixture in a region of the wellbore from which fluid loss is to be controlled.

2. The process of claim 1 wherein the aqueous-based mixture is spotted to a location, above a location where fluid loss is suspected to be occurring or is anticipated.

3. The process of claim 1 wherein the aqueous-based mixture is injected after a casing within the wellbore is perforated.

4. The process of claim 1 wherein the aqueous-based mixture is injected after a gravel pack is placed within the wellbore.

5. The process of claim 1 wherein the polymer is selected from the group consisting of succinoglycan, hydroxy ethyl cellulose, xanthan gum, starch and starch derivatives, polysaccharides, carboxymethylcellulose, hydroypropyl guar, guars, and cross-linked derivatives of the above.

6. The process of claim 1 wherein the organic acid portion of the halogen-substituted organic acid is a one-to-three-carbon organic acid component.

7. The process of claim 6 wherein the halogen-substituted organic acid is a halogen-substituted carboxylic acid.

8. The process of claim 1 wherein the halogen-substituted organic acid salt is a chloroacetic acid sodium salt.

9. The process of claim 1 wherein the period of time is within the range of about 7 to about 200 hours.

10. The process of claim 1 wherein additional halogen-substituted organic acid or halogen-substituted organic acid salt is included within the wellbore fluids injected into the wellbore after the aqueous-based mixture is injected into the wellbore.

11. The process of claim 1 wherein additional acidic components are injected into the wellbore after the period of time.

12. The process of claim 1 wherein the aqueous mixture further comprises an amount of a base capable of neutralizing acid generated by the halogen-substituted organic acid salt prior to the end of the controlled period of time.

13. The process of claim 1 wherein the aqueous mixture comprises salt crystals.

14. The process of claim 13 wherein the polymer is selected from the group consisting of starch, starch derivative, hydroxyethyl cellulose, xanthan gum and combinations thereof.

* * * * *